United States Patent
Gasafi et al.

(10) Patent No.: US 10,569,245 B2
(45) Date of Patent: Feb. 25, 2020

(54) METHOD AND DEVICE FOR THE HEAT TREATMENT OF GRANULAR SOLIDS

(71) Applicant: OUTOTEC (FINLAND) OY, Espoo (FI)

(72) Inventors: Edgar Gasafi, Karlsruhe (DE); Bertold Stegemann, Eschborn (DE); Bernd Reeb, Friedrichsdorf (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/999,502

(22) Filed: Aug. 20, 2018

(65) Prior Publication Data
US 2019/0001291 A1 Jan. 3, 2019

Related U.S. Application Data

(63) Continuation of application No. PCT/EP2017/053944, filed on Feb. 21, 2017.

(51) Int. Cl.
*B01J 6/00* (2006.01)
*B01J 8/00* (2006.01)
(Continued)

(52) U.S. Cl.
CPC ............ *B01J 6/004* (2013.01); *B01J 8/1836* (2013.01); *B01J 8/26* (2013.01); *B01J 8/34* (2013.01);
(Continued)

(58) Field of Classification Search
CPC ..... B01J 6/00; B01J 6/001; B01J 6/004; B01J 8/00; B01J 8/18; B01J 8/1836; B01J 8/24;
(Continued)

(56) References Cited

U.S. PATENT DOCUMENTS

| 4,076,796 A | 2/1978 | Reh et al. |
| 4,091,085 A | 5/1978 | Reh et al. |

(Continued)

FOREIGN PATENT DOCUMENTS

| DE | 102007009758 A1 | 8/2008 |
| WO | WO-2004056471 A1 | 7/2004 |

(Continued)

OTHER PUBLICATIONS

International Search Report issued by the European Patent Office acting as the International Searching Authority in relation to International Application No. PCT/EP2017/053944 dated May 12, 2017 (5 pages).

(Continued)

*Primary Examiner* — Natasha E Young
(74) *Attorney, Agent, or Firm* — Robert P. Michal, Esq.; Carter, DeLuca & Farrell LLP

(57) ABSTRACT

A method for the heat treatment of granular solids includes initially introducing solids into a first reactor configured as a flash reactor or fluidized bed reactor where they are brought into contact with hot gases at temperatures in the range 500° C. to 1500° C. Next, the solids are passed through a residence time reactor in which they are fluidized. The residence time reactor is configured in a manner such that it has various regions which are separated from one another, from which the solid can be withdrawn in a manner such that it is provided with a variety of residence times in the residence time reactor.

9 Claims, 2 Drawing Sheets

(51) Int. Cl.
  *B01J 8/18* (2006.01)
  *B01J 8/26* (2006.01)
  *B01J 8/34* (2006.01)
  *B01J 8/36* (2006.01)
  *C22B 1/10* (2006.01)

(52) U.S. Cl.
  CPC ............... *B01J 8/36* (2013.01); *C22B 1/10* (2013.01); *B01J 2208/0053* (2013.01); *B01J 2208/00557* (2013.01)

(58) Field of Classification Search
  CPC ......... B01J 8/26; B01J 8/34; B01J 8/36; B01J 2208/00–00017; B01J 2208/0053; B01J 2208/00548; B01J 2208/00557; C22B 1/00; C22B 1/02; C22B 1/10
  See application file for complete search history.

(56) References Cited

U.S. PATENT DOCUMENTS

| | | | |
|---|---|---|---|
| 5,560,762 A | | 10/1996 | Bresser et al. |
| 7,144,516 B2* | | 12/2006 | Smith ............... B01D 21/0018 210/803 |
| 7,807,056 B2* | | 10/2010 | Frazier ............... E21B 21/066 210/259 |
| 2011/0034318 A1 | | 2/2011 | Gasafi et al. |
| 2015/0217248 A1* | | 8/2015 | Wang ............... B01D 1/18 427/213 |

FOREIGN PATENT DOCUMENTS

| WO | WO-2004097055 A2 | 11/2004 |
|---|---|---|
| WO | WO-2009026989 A1 | 3/2009 |

OTHER PUBLICATIONS

International Preliminary Report on Patentability issued by the European Patent Office acting as the International Preliminary Examining Authority in relation to International Application No. PCT/EP2017/053944 dated Jun. 19, 2018 (8 pages).

Written Opinion of the International Searching Authority issued by the European Patent Office acting as the International Searching Authority in relation to International Application No. PCT/EP2017/053944 dated May 12, 2017 (5 pages).

\* cited by examiner

METHOD AND DEVICE FOR THE HEAT TREATMENT OF GRANULAR SOLIDS

CROSS-REFERENCE TO RELATED APPLICATIONS

This application is a continuation of PCT International Application No. PCT/EP2017/053944, now WO 2017/144469, filed on Feb. 21, 2017, which claims priority to German Patent Application No. 10 2016 103 100.3, filed on Feb. 23, 2016, the disclosure of each of these applications is expressly incorporated herein by reference in their entirety.

FIELD OF THE INVENTION

The invention relates to a method for the heat treatment of granular solids, wherein the solids are initially introduced into a first reactor configured as a flash reactor or fluidized bed reactor where they are brought into contact with hot gases at temperatures in the range 500° C. to 1500° C., wherein the solids are then guided through a residence time reactor in which they are fluidized. The invention also relates to a device for carrying out the method.

BACKGROUND INFORMATION

In the usual methods for the treatment of finely granulated solids, for example a circulating fluidized bed, residence times are defined by a series of boundary conditions. In the example of the circulating fluidized bed, the residence time is determined by the quantity of the solid contained in the fluidized bed, the pressure drop between the reactor bottom and the upper region, as well as by the feed rate of the solid. In summary, then, the residence time in the circulating fluidized bed is defined as the relationship between the total mass of the moving bed and the mass throughput of the unit.

In the circulating fluidized bed, the residence time for the solid in the fluidized bed can be determined by adjusting the pressure drop, but the window for such an adjustment is limited, because on the one hand the pressure drop in the system could become too high when the charge is correspondingly high, or on the other hand when the drop is too low, a homogeneous bed is no longer formed.

This is also the case for other systems with a defined geometry and a fixed volume in which, in general, the residence time for the solid in the respective reactor system is inversely proportional to the throughput of the unit, which is why large variations in the solid residence time can result in different reaction conditions and thus in substantial fluctuations in the quality of the product.

There is also a problem with the interaction between the capacity of the unit and the residence time, and so, in order to be able to produce consistent residence times, even the mass throughputs can only be operated with slight variations, or the solid residence time has to be capable of being kept substantially constant irrespective of the charge status of the unit.

OBJECTS AND SUMMARY OF THE INVENTION

An object of the invention is to provide a system with is able to set various residence times, and in particular a variety of relatively long residence times.

This object is achieved by means of the method.

A method of this type contains, in a first step, a flash reactor or a fluidized bed reactor, where granular solids are introduced and which are brought into contact with hot gases at a temperature in the range 500° C. to 1500° C. Next, the solids are passed through a residence time reactor, where they are fluidized. The residence time in this residence time reactor ranges between 10 to 600 min.

The invention provides that the residence time reactor is configured in a manner such that it is provided with various mutually separated regions from which the solid can be separately removed in a manner such that it has a residence time in the residence time reactor which is of a variable duration. The volume of the residence time reactor itself is thereby configured in a flexible manner so that either the residence time can be varied, or indeed the effective utilized volume of the residence time reactor can be incrementally adjusted to the respective unit charge and therefore, even with throughputs that vary widely, a substantially constant residence time and thus a consistent product quality can be ensured.

Preferably, a first reactor is connected upstream of the residence time reactor, particularly preferably a flash reactor or a fluidized bed reactor, more particularly preferably a circulating fluidized bed reactor (also known as a CFB reactor). Preferably, the CFB is used as the first reactor because it enables a very homogeneous temperature distribution to be obtained. However, a flash reactor in particular, but also to a lesser extent a circulating fluidized bed reactor, suffer from a disadvantage as regards to their ability to provide residence times that are only at values of a few seconds (flash reactor) typically to up to low double digit of minutes for commercial applications in the CFB. In the method, it is possible to provide the solid with a very homogeneous heat treatment and then, in particular when a fluidized bed reactor is used, to feed it into the residence time reactor which can be operated in a flexible manner as a function of the capacity of the unit or the residence time.

In one embodiment of the invention, withdrawal from the various regions of the residence time reactor is carried out in a manner such that not all of the regions are fluidized, wherein the fluidized regions are connected in succession in the direction of flow. This means that the residence time reactor has 1 to n regions and only the regions 1 to n-m through which the solid passes in succession are fluidized. Thus, only the front region but not, however, the rear region of the residence time reactor, which is variable in volume, is fed. Because of the lack of fluidizing gas, its contents fall to the bottom and remain there until the fluidization is switched back on again. The fluidized material in the front regions is discharged from these regions by overflow. This is a very simple variation which can be obtained with an existing system by separately controlling the nozzles in the individual regions.

In another variation of the invention which may also be carried out at the same time, active removal is possible in any one of the n regions. In this regard, depending on the capacity of the unit or the required residence time, it can be decided as to which region shall be used from which to remove the solid. As an example, when five chambers are provided, removal may be carried out from the third chamber so that then the last two chambers are no longer available for further heat treatment of the granular solid. Removal in this manner has the advantage that in the downstream regions, only small quantities of solid fall onto the bottom and are removed when these regions re-start, being mixed up and leading to inconsistent product qualities.

It is also possible to combine these two variations together, so that solid is removed from one region and regions which are fluidically behind this region are also no longer fluidized. In this manner, the advantages of both removal possibilities are combined with each other.

Furthermore, in a preferred variation of the invention, the fluidized bed reactor acting as the first reactor is a circulating fluidized bed. The advantage of a circulating fluidized bed is that here, the temperature prevailing in the reactor is particularly homogeneous and can be adjusted precisely. At the same time, however, it has the distinct disadvantage in that it provides residence times in the low double digit of minutes region in commercial applications. However, this disadvantage can be compensated for by the downstream residence time reactor.

Preferably, air is used as the fluidizing gas, because in this case a source of oxygen is simultaneously available and, moreover, air is ubiquitously and freely available in any quantities.

Typically, the residence time in the first reactor is in the range 0.1 sec to 15 min preferably in the range 0.1 to 10 sec when using a flash reactor, and in the range 1 to 15 min when using a circulating fluidized bed.

Furthermore, a residence time in what is known as the residence time reactor in the range 10 to 600 min, preferably in the range 15 to 40 min has been shown to be advantageous because these are typical values which cannot be obtained in an upstream reactor.

More preferably, the temperature in both reactors is in the range 750° C. to 1500° C., advantageously in the range 1050° C. to 1100° C., particularly preferably in the range 1060° C. to 1090° C. which, for example, includes the range of temperatures for the production of lithium carbonate from lithium-containing ores. The production of lithium is highly sensitive to the residence time reactor temperature so that here, the flexibility of the residence time reactor in accordance with the invention is of particular importance in order to obtain a consistent product quality.

Furthermore, the invention also pertains to a device for carrying out the method.

A device of this type comprises a residence time reactor which is configured in a manner such that the granular solid therein is fluidized. The invention provides that at least a portion of the residence time reactor is divided by partitions into a plurality of regions which can be separately fluidized and/or which have separate outlets. This means that solid can be removed from various positions in the residence time reactor, and thus either the residence time can be varied, or the same residence time can be constantly ensured with different charge amounts.

Particularly preferably, the individual regions are graduated with respect to each other, wherein the last region to be passed through is preferably at the lowest point and the first region is at the highest point with respect to the bottom and the other intermediate regions run stepwise from the topmost to the bottommost region. This has the advantage that in this manner, the solid can flow particularly easily from one region to the others and no accumulations of solid occur in the individual zones.

More preferably, a conveyor is provided after the extraction point of the residence time reactor. A common conveyor may be accessed by all of the extraction points. An example for a conveyor of this type is what is known as an air slide.

Further aims, features, advantages and applications of the invention will become apparent from the following description of the accompanying drawings. All of the described and/or depicted features, by themselves or in any combinations, form the subject matter of the invention, independently of whether they are defined in the individual claims or their dependencies.

DETAILED DESCRIPTION

Figure 1:
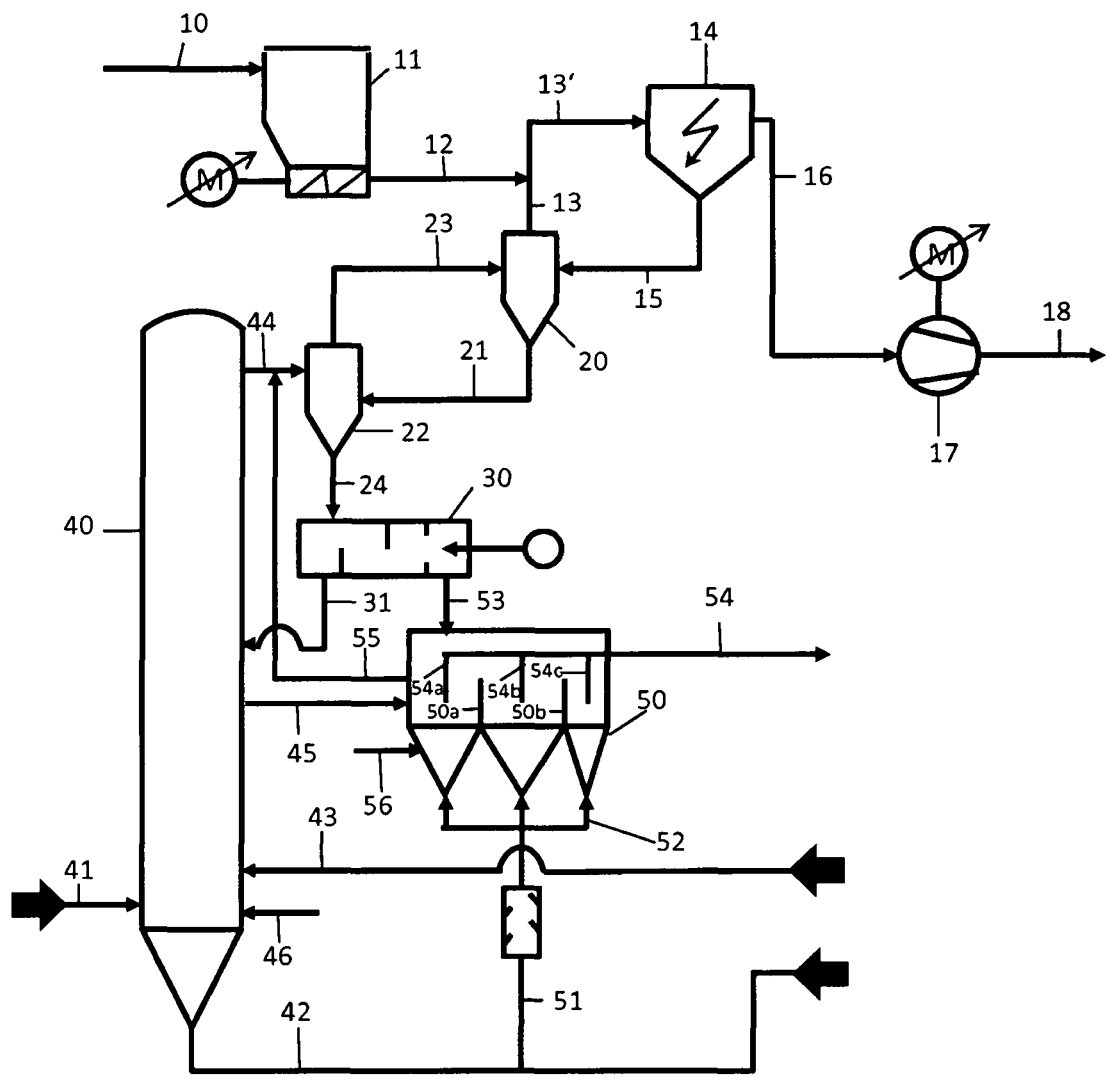
FIG. 1 shows a process flow diagram of the method in accordance with the invention.

The solid is supplied to a storage container 11 via line 10, from which it is mixed via line 12 into line 13 and then is fed into an electrostatic precipitator 14 via the line 13'. The granular solid is transported from the electrostatic precipitator 14 into the first preheating stage 20 via line 15.

Hot gas is withdrawn from the first preheating stage 20 via the line 13 and supplied together, as is known, with the solid via the line 13' to the electrostatic precipitator 14, in which a first preheat and a separation of the solid from the gas are carried out. Next, the gas is sent to a compressor 17 via line 16 and from there for waste gas purification, not shown, via line 18.

The solid is transported from the first preheating stage 20 into the second preheating stage 22 via line 21. The hot gas from the preheating stage 22 is recycled to the first preheating stage 20 via line 23 as a counter-current in order to optimize the energy efficiency of the method.

The solid is supplied via line 24 to a seal pot 30 with a discharge device, from which it is passed via line 31 to the first reactor 40 configured as a circulating fluidized bed; in addition, the material is discharged via line 53 to the downstream second reactor 50.

This first reactor 40 is supplied with fuel via line 41. Furthermore, for fluidization, what is known as primary air is introduced via line 42 into the bottom of the reactor 40. In order to form a circulating fluidized bed, secondary air is also required, which is introduced via line 43.

Hot waste gas is withdrawn from the first reactor via line 44 and introduced into the second preheater 22 in order to use the energy contained therein for preheating. The solid is supplied to the metering device 30 via line 45, from which it enters the residence time reactor 50. Furthermore, a line 51, which transports fluidization air to the residence time reactor 50 in order to fluidize the solid, branches off from the primary air supply line 42. Line 52 constitutes the first possibility for introducing the additional fuel, which then is already mixed with the fluidization air in the line 51. In addition or alternatively, the fuel may also be introduced via a separate system, as indicated by line 56, directly into the residence time reactor 50. Because of the partitions 50a and 50b, the residence time reactor is divided into three chambers from which the solid can be separately withdrawn via the lines 54a, 54b and 54c.

The solid is finally withdrawn via line 54. In this regard, a sealpot as described in DE 10 2007 009 758 may be envisaged. The hot air from the residence time reactor 50 is mixed with line 44 via line 55 and from here it is returned to the second preheating stage 22.

Figure 2:
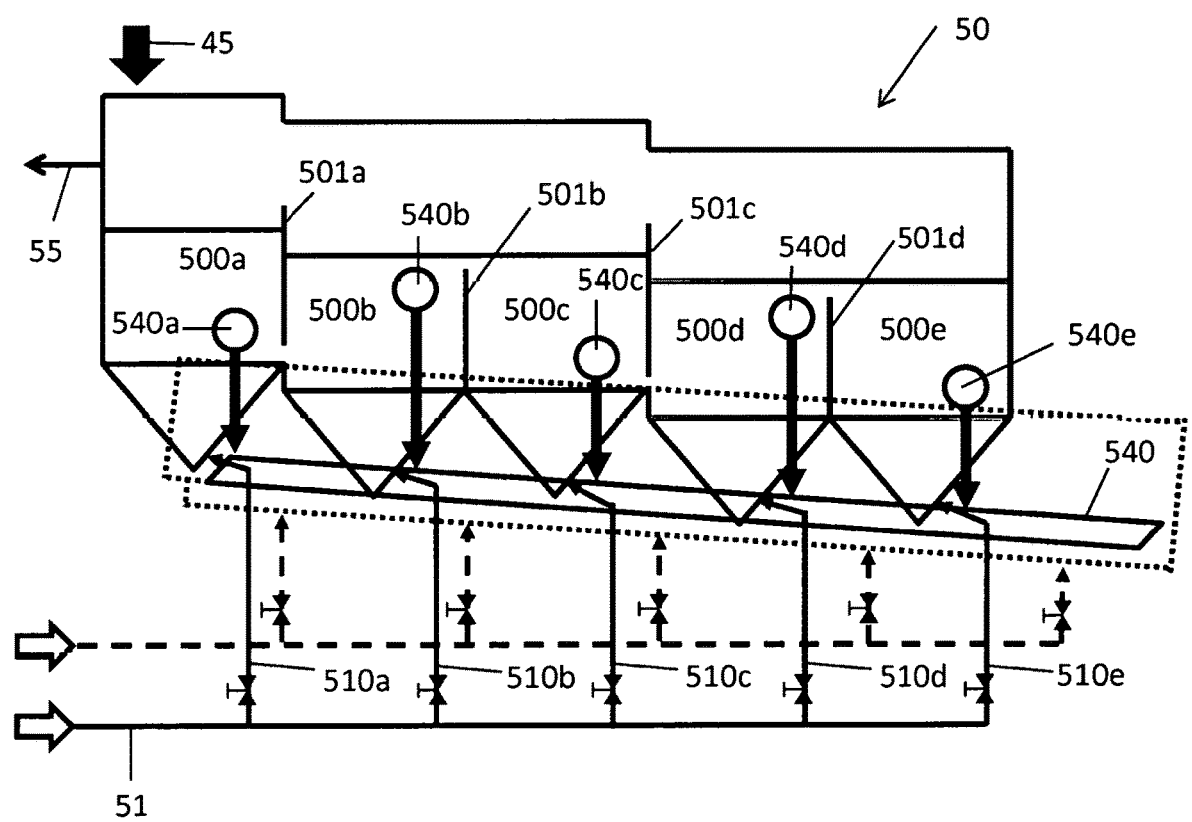
FIG. 2 shows a diagrammatic representation of the reactor in accordance with the invention.

FIG. 2 shows the residence time reactor 50 in accordance with the invention. Because of partitions 501a, 501b, 501c and 501d, the individual regions 500a, 500b, 500c, 500d and 500e of the residence time reactor 50 are separated from each other in a manner such that they are now only partially fluidically linked together. In this regard, the walls 501a and 501c are configured in a manner such that a fluidic connection exists in the lower region of the reactor, whereas the walls 500b and 500d allow a fluidic connection exclusively in the upper region, wherein the overall arrangement of the walls must be such that in operation, the fluidized beds in the individual regions 500a, 500b, 500c, 500d and 500e are fluidically connected together, i.e. solid can move from one region to the next.

The individual regions 500a, 500b, 500c, 500d and 500e are thus designed in a manner such that region 500a, regions 500b and 500c and regions 500d and 500e form steps; a different type of step arrangement is also possible. It only needs to be ensured that directly connected regions are always at the same or a lower level than the previously traversed regions, so that the solid and blockages can pass through the individual regions in succession.

The individual regions 500a, 500b, 500c, 500d and 500e may be fluidized separately via individual lines 510a, 510b, 510c, 510d and 510e. Preferably, these lines contain individual regulating or control devices to supply the fluidization air.

Furthermore, each region 500a, 500b, 500c, 500d and 500e has its own removal device 540a, 540b, 540c, 540d and 540e, via which solid can be separately removed from each of the regions 500a, 500b, 500c, 500d and 500e. The solid removed actively by means of the removal devices 540a, 540b, 540c, 540d and 540e and/or passively by means of lack of fluidization is then removed via a line 540. In this regard, the dotted lines represent what is known as an air slide.

Example

An example of an application is calcining of spodumene ores in order to convert α-spodumene into β-spodumene. The process requires a high temperature of more than 1050° C. and a sufficient residence time of more than 30 minutes in order to convert sufficient of α-phase into β-phase. The use of the fluidized bed is advantageous compared with the rotary kiln which is otherwise employed, because precise temperature control is required in order to avoid overheating the minerals and thus to prevent dead burning. The residence time reactor is thus connected downstream of the fluidized bed reactor and in this manner enables the limited residence time in the reactor to be extended to the desired residence time of 40 minutes, for example.

LIST OF REFERENCE NUMERALS 10 line
11 solid storage container
12,13, 13' line
14 electrostatic precipitator
15, 16 line
17 compressor
18 line
20 first preheating stage
21 line
22 second preheating stage
23-25 line
30 metering device
31 line
40 reactor with circulating fluidized bed
41-46 line
50 residence time reactor
50a, 50b partition
51-55 line
500a-500e region
501a-501d partition
510a-510e line
540a-540e removal device

The invention claimed is:

1. A method for the heat treatment of granular solids, wherein the solids are initially introduced into a first reactor configured as a flash reactor or fluidized bed reactor where they are brought into contact with hot gases at temperatures in the range of 500'C to 1500° C., and wherein the solids are then guided through a residence time reactor in which they are fluidized with a fluidizing gas, wherein the residence time reactor is configured in a manner such that it is provided with various mutually separated regions from which the solid is separately removed in a manner such that it has a residence time in the residence time reactor which is of a variable duration, wherein removal from the various regions of the residence time reactor is carried out in a manner such that not all of the regions are fluidized, wherein the fluidized regions are fluidically connected in succession, whereby specific downstream regions are no longer fluidized with a fluidizing gas and therefore actively removed and wherein each region has its own removal device.

2. The method as claimed in claim 1, wherein solid is actively removed from at least one region.

3. The method as claimed in claim 1, wherein the first reactor is provided with a circulating fluidized bed.

4. The method as claimed in claim 1, wherein the air is used as the fluidizing gas in the residence time reactor.

5. The method as claimed in claim 1, wherein the residence time in the first reactor is in the range 0.1 sec to 15 min.

6. The method as claimed in claim 1, wherein the residence time in the residence time reactor is in the range 10 to 600 min.

7. The method as claimed in claim 1, wherein lithium carbonate is produced and/or the temperature in both reactors is in the range 750° C. to 1500° C.

8. A device for the heat treatment of finely granulated solids, comprising a first reactor for performing a method according to claim 1, which is configured as a flash reactor or as a fluidized bed reactor, and a second reactor, which is configured as a residence time reactor, wherein at least a portion of the residence time reactor is divided into a plurality of regions by means of partitions which are separately fluidized and which have separate outlets.

9. The device as claimed in claim 8, wherein the individual regions are disposed with respect to each other in the manner of steps.

* * * * *